April 16, 1968  D. COLVIN ET AL  3,378,479
ELECTROLYTIC CELL AND CHLORINATING SYSTEM USING SAME
Filed June 26, 1964  2 Sheets-Sheet 1

INVENTORS
DONALD COLVIN
VERNON A. SCHULTZ
Schapp & Hatch
ATTORNEYS

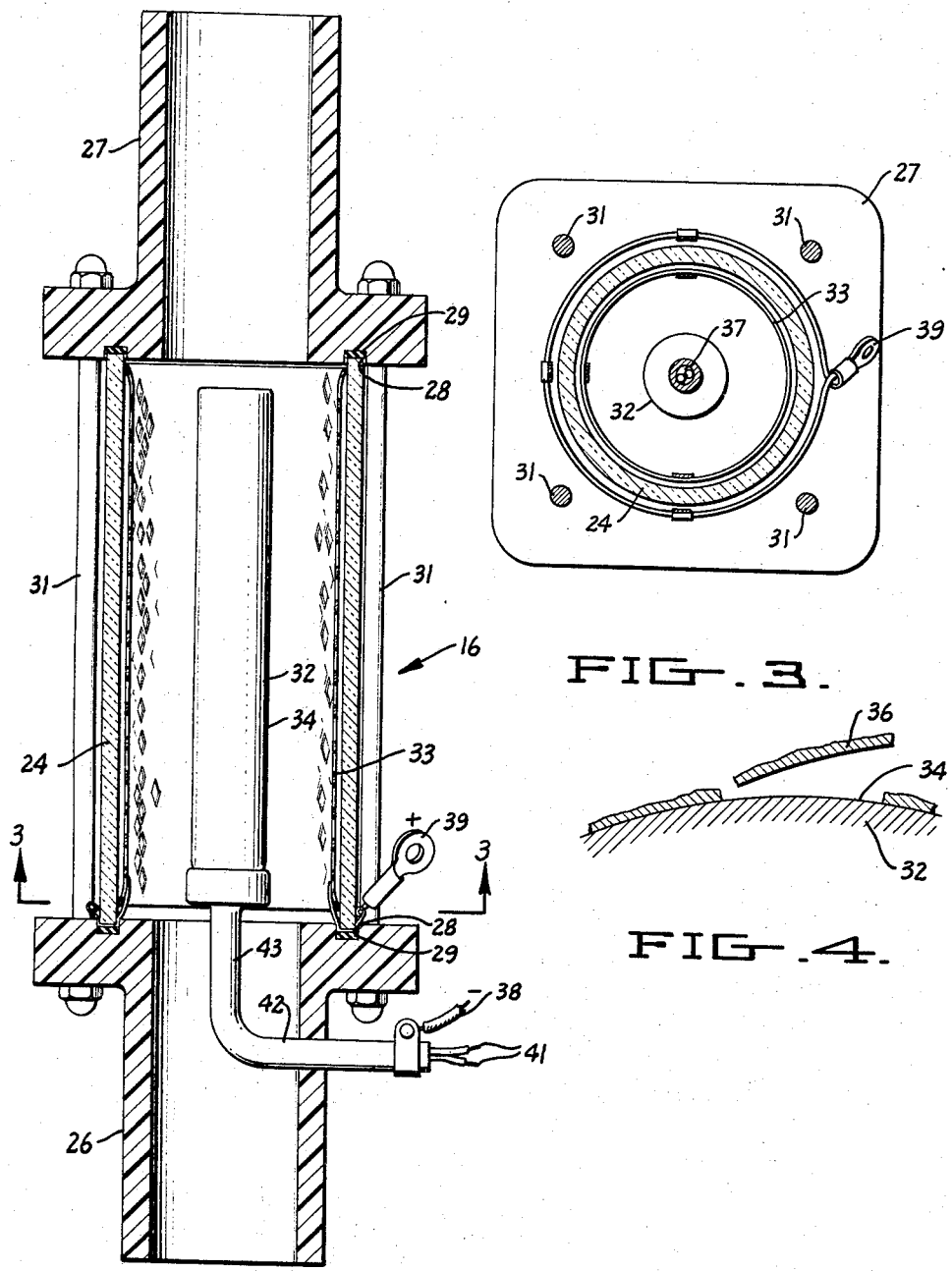

United States Patent Office 3,378,479
Patented Apr. 16, 1968

3,378,479
ELECTROLYTIC CELL AND CHLORINATING SYSTEM USING SAME
Donald Colvin, San Francisco, and Vernon A. Schultz, El Sobrante, Calif., assignors to Simplex Manufacturing Co., Richmond, Calif., a corporation of California
Filed June 26, 1964, Ser. No. 378,411
11 Claims. (Cl. 204—248)

ABSTRACT OF THE DISCLOSURE

An electrolytic cell for chlorinating swimming pools, in which the electrolytic cell is constructed to solve scale problems heretofore encountered when using the cell to form chlorine from aqueous salt solution; the cell containing a transparent housing, a sleeve-like see-through anode fitting within the housing and near the transparent wall thereof, and an elongated cathode adapted to be centrally aligned in the cell, the anode and the cathode being constructed of dissimilar metals so that a galvanic cell is provided during the off period, said cathode being characterized by containing a smooth surface from which scale formed during electrolysis is easily shed and a variable radius of curvature influenced by the temperature thereof, and an auxiliary heater for increasing the temperature gradient during operation; the system also being provided with an accumulator downstream of the electrolytic cell to collect scale formed in the cell and sloughed off therefrom.

---

Figure 1:
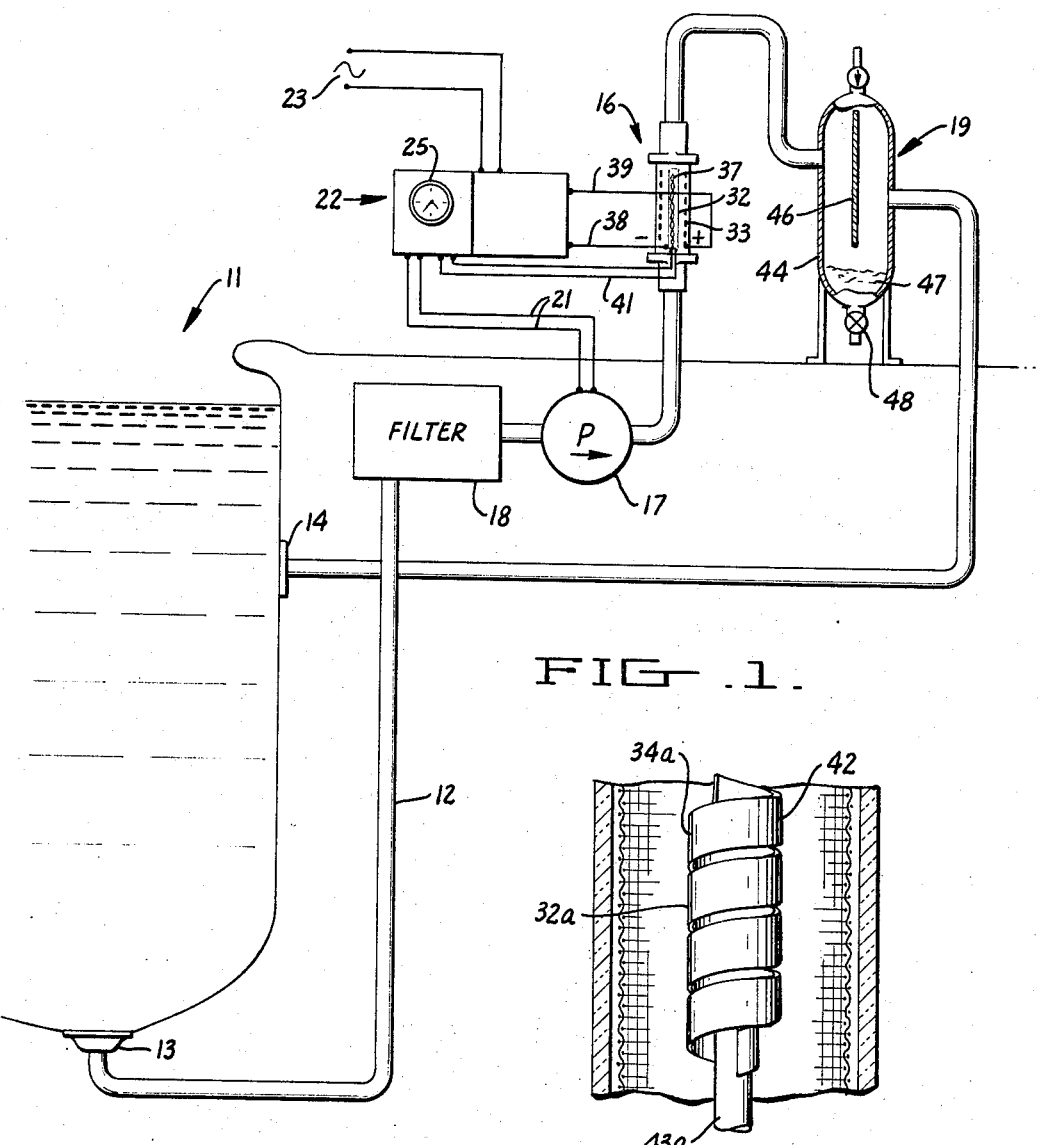

The present invention relates to improvements in an electrolytic cell and chlorinating system using same and more particularly to an improved electrolytic cell suitable for use in a chlorine generating unit adapted to supply chlorine to swimming pools and the like.

It is well-known to use chlorine for the purpose of sterilizing large bodies of water such as swimming pools, and it is also known to provide such chlorine by any of a number of methods. One of the methods which has proven to be suitable for chlorinating swimming pools is that disclosed and claimed in U.S. Patent 2,887,444 to Frank F. Lindsteadt where an electrolytic system is shown that provides chlorine by the process of electrolysis directly in water recirculated from the swimming pool. In this way, the desired concentration of the chlorine is maintained without danger of providing an excessive concentration of chlorine in any one place.

Thus the advantages of this system reside in its ability to operate according to demand over a long period of time to maintain the desired concentration of chlorine and keep the concentration at safe yet relatively comfortable values. The system may also reduce the cost of chlorinating and obviate other problems such as those associated with the handling of hypochlorites or other commercially available chlorine sources.

While the system described above has been eminently satisfactory for the purpose, certain problems have arisen in connection with the problem of the electrolytic cell. One of these problems is the formation of scale on the cathode which in turn interferes with the proper operation of the unit. This scale problem is caused by calcium and related materials found in hard waters. Such hard water is frequently used in swimming pools because the pools are abundantly located in areas of water shortages or where good fresh water sources are limited. In addition, even where the pools are filled with soft water, the calcium concentration builds up to high levels because of contact between the water and pool plaster or the like.

Certain ways of attacking this scale problem have been suggested such as the use of water softener and conditioners, but such usage can be very expensive without being completely effective in solving the problem. The present invention relates to a solution of this problem which resides in a special construction of the electrolytic cell so that the cell has the ability to slough off and get rid of unwanted calcium scale. In this way it is unnecessary to prevent formation of scale and exceedingly hard waters may be utilized without undue injury to the electrolytic system.

Other problems have been encountered in the cell construction of electrolytic cells of the character described such as the inspectability of the cell. Heretofore, it has been customary to provide transparent walls so that the internal portions of the cell may be inspected periodically and proper maintenance of the cell may be assured through this inspection. However, such transparent walls frequently get clouded up and render it impossible for the inspector to adequately see the internal structure of the cell. Accordingly, the present invention also provides a solution to this problem.

In addition to these two problems, it will be appreciated that other improvements will be included in the present electrolytic cell, and that these improvements will be described more fully during the complete description of a typical form of the invention.

Thus it is a primary object of the present invention to provide an electrolytic cell which is constructed to automatically cause removal of scale that tends to form on the cathode thereof during the ordinary operating procedures.

Another object of the invention is to provide a swimming pool chlorinating system including an electrolytic cell of the character described which is capable of sloughing off scale formed on the cathode thereof and carrying said scale to a position where it does not interfere with proper functioning of the system.

Still another object of the invention is the provision of an electrolytic cell of the character described which contains improved simplified components which are designed to maintain at least one transparent wall of the cell in clean condition during the operation thereof.

Still another object of the invention is to provide a method of chlorinating swimming pools and the like which includes the steps of intermittently operating an electrolytic cell designed to slough off any scale that forms on the cathode thereof during said intermittent operation.

Further objects and advantages of the invention will be apparent as the specification progresses, and the new and useful features of the electrolytic cell will be fully defined in the claims attached hereto.

Figure 5:
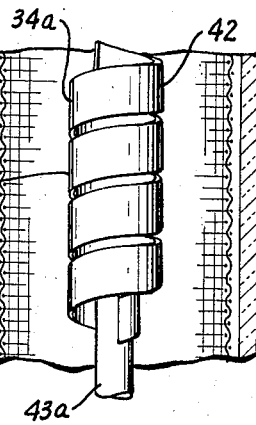

The preferred forms of the invention are illustrated in the accompanying drawings forming a part of this description, in which:

FIGURE 1 is a schematic elevational view of a chlorinating system constructed in accordance with the present invention and containing a novel chlorinating cell therein;

FIGURE 2, a cross-sectional elevational view in enlarged form of the chlorinating cell shown in the system illustrated in FIGURE 1;

FIGURE 3, a cross-sectional view of the cell illustrated in FIGURE 2 taken substantially in the plane of line 3—3 thereof;

FIGURE 4, an enlarged view of the cathode surface illustrating the manner in which scale is removed therefrom; and FIGURE 5, a view of an alternate form of cathode that may be utilized in the present invention.

While only the preferred forms of the invention are shown, it should be understood that various changes or modifications may be made within the scope of the claims attached hereto without departing from the spirit of the invention.

Referring to the drawing in greater detail, there is shown in FIGURE 1 a system for chlorinating a swimming pool 11 comprising a fluid line 12 in fluid connection with the pool 11 at 13 and 14 and containing an electrolytic cell 16 therein for the electrolytic production of chlorine. The system also includes a pump 17, and filter 18 in advance of the pump and accumulator trap 19 downstream of the electrolytic cell for removing scale formed in the cell from the line 12.

The preferred order of components for line 12 is illustrated in FIGURE 1, where the filter 18 is nearest the inlet portion 13 to protect the pump from entry of any foreign materials, and the cell 16 is downstream of the pump so that the highly chlorinated stream will not pass through the pump. The accumulator trap 19 is positioned downstream of cell 16 in order to collect the calcium scale formed in the cell and moved downstream therefrom by the moving current of water in the supply line 12. The filter and pump may be any conventional filter and pump system suitable for use in swimming pools. As here shown, the pump may be an electric pump supplied from conventional current sources through supply lines 21. This supply line 21 goes through a control board 22 which provides suitable switching and rectifying units whereby conventional line current from any suitable power source such as source 23 may be rectified into direct current for the operation of the electrolytic cell and also supply current through suitable switches to operate the pump and a heating element in the cell when such heating element is provided. Control unit 22 may also be provided with a suitable clock timer 25 for automatic operation that can be set to continue operation in the absence of adjusted manual operation.

The electrolytic cell 16 is constructed to contain a novel cathode which is capable of discarding calcium scale from the surface thereof to solve the problems heretofore occurring when the build-up of calcium scale prevented proper operation of the cell. In addition, the cell contains an improved design structure which provides improved efficiency and maintains the unit in clean viewable condition for inspection.

Thus, as shown in FIGURE 2, cell 16 comprises a transparent tubular housing 24, a pair of end fittings 26 and 27 which have recesses 28 therein adapted to receive the ends of the housing 24, and assembly bolts 31 for drawing the two fittings together and sandwiching the housing therebetween. Suitable sealing gaskets 29 are provided in recesses 28 to seal the unit. With this construction, the unit may be easily disassembled for service or replacement of parts. The transparent housing is preferably made of glass in order to provide the desired physical properties and give a surface which is easily cleaned. However, it will be appreciated that other transparent materials such as certain plastics may be used, if desired.

The plastic fittings 26 and 27 also provide an insulating barrier so that any potential in the electrolytic cell that might otherwise be present at the ends of the cell do no cause a shock hazard or other problems. Accordingly, these fittings are built long enough that they may be attached to metal pipes with minimal potential in the electrolyte at their distal ends from the cell. In this connection, it is preferred to utilize rather low voltage such as say 12 to 18 volts in the cell.

In addition to the basic structure of this cell, there is provided a cathode 32 which is preferably cylindrical or rod shaped and centrally disposed within the transparent housing 24. An anode 33 is also provided in juxtaposed position to the housing 24 and is preferably disposed in opposed position to the cathode so that uniform current densities are provided throughout the interior of the cell.

An important feature of this invention is to provide the anode 33 in close proximity to the transparent glass housing 24 so that the hydrochloric acid and any other acid formed in the vicinity of this anode will keep the glass clean at all times and positively assure the ability of the operator to visually inspect the interior of the cell. In this connection, it is not only important that the housing be transparent, but it is also important to provide an anode which may be seen through. Accordingly, we prefer to utilize a mesh-like anode having openings therein with the entire anode sleeve-shaped to fit within the housing as indicated above. In this way, substantially all of the water flowing through line 12 passes through the annular space between the cathode and anode.

A typical anode having openings for viewing is constructed of expanded wire. In order to render the anode capable of making chlorine over a suitable period of time, it is preferred to construct the anode from platinum rolled onto tantalum. Such a product is manufactured and is readily available. Thus the anode also has a platinum surface which is resistant to acids and chlorine and capable of long continued operation. Suitable platinum substitutes may also be used, if desired, such as iridium and platinum-iridium alloy.

As indicated above, it is preferred to locate the cathode 32 along the central axis of the electrolytic cell so as to provide a substantially uniform distance between the cathode and the anode and maintain a substantially uniform current density within. Thus, the cathode may be tubular shaped as shown in FIGURES 1 and 2, or it may be in the shape of a helix shown in FIGURE 5, or it may be in the shape of a relatively narrow flat strip adapted to fit in the central portion of this cell. Alternatively, it will be appreciated that the cathode could be broken up into a number of smaller cathodes and in such a case these would form a substantially elongated cathode position along the axis of the tube when all of the cathodes are considered together.

As indicated above, it is important to provide a cathode which is capable of solving the scale problem so as to extend the life of the anode and thereby increase the overall life of the cell. It is also desirable to provide an inspection means whereby the cathode may be visually inspected so as to determine any accumulation of scale or other problem that might occur should the unit be operating unsatisfactorily, or reaching a state of wear such that the unit is no longer usable. Another advantage to the scale removing system incorporated in the present invention resides in the removal of calcium materials from the swimming pool water which is accomplished by operation of the method and apparatus of this invention because the scale pieces that are sloughed from the cathode 32 will either be collected in the accumulator, or in the event the unit is not provided with an accumulator, will be picked up by the filter 18. In this way, calcium is removed from the swimming pool water and a softer water results. This allows for the omission of other water softening procedures or apparatus heretofore used.

As indicated above, the scale problem is solved in accordance with the invention by virtue of a number of systems directed to this problem which are preferably utilized in combination. However, it will be appreciated that in certain instances where the scale problems are not so severe, that any one or certain ones of these systems may be utilized alone and achieve satisfactory results.

The first requirement for the cathode in a cell of this nature is the utilization of a metal cathode having an especially smooth surface whereby metal oxides formed on the cathodes may be sloughed off from the cathode surface along with the scale to effect removal therefrom. Thus, in its broad aspect, the metal may be any metal which is capable of a long life in electrolytic solution containing chloride ion and that has the property of being higher than platinum on the electromotive series. In other words, metals higher than platinum will form oxide coatings through the galvanic effect when the cell is turned off so that even materials such as copper which are below hydrogen will form such an oxide coating. However, it is important that the oxide coating be relatively removable from the base metal, and copper has been found to be very poor in this regard. Other metals that tend to form unsightly oxides such as iron are probably best avoided also. Nevertheless, it will be appreciated that in certain instances, the use of copper and iron on especially smooth cathode surfaces are operative and may be within the scope of the invention. For especially good results, however, metals such as chromium and nickel should be used either alone or in combination. It is also preferred that these metals be present in a state which undergoes the galvanic action. In other words, extremely resistant metals such as stainless steel are operative but not particularly satisfactory even though stainless steel contains a high percentage of nickel and chromium.

Thus, the operation achieved by the galvanic effect takes place as follows: during the "off" period of the cell, oxide coatings form on the smooth cathode surface through the galvanic effect and build up to an amount sufficient that they will assist in removal of scale as they themselves are dislodged from the surface of the base metal; then during the "on" operation as calcium carbonate or other scale material builds up on the surface of the cathode, it tends to strip off due to physical action provided by the expansion of the metal, the turbulence of moving water and the production of hydrogen gas at the cathode. In this way, scale is removed as it is formed during the "on" period with bits of scale such as the scale 36 peeling off the surface 34 of cathode 32 as shown in FIGURE 4.

While scale may be removed through the galvanic action which provides easily removable oxide coatings, it is also desirable to provide heat at the electrode so as to condition the scale as it is laid down thereon and render it easier to remove. A certain amount of heat is inherent in the operation of the unit and whatever heat is provided by the electrical energy dissipated in the cathode will be to advantage. However, when the scale problem is especially severe, it is desirable to provide an auxiliary heater. This heater causes the scale adjacent to the electrode surface to dry and form a hard scale. This hard scale will flake off easily and provide scale flakes which will be removed from the system and also render the water softer as explained above. When the heat is minimal, the scale tends to lay down in a comparatively wet form, and this wet scale is harder to flake off. In addition, the wet scale tends to redissolve easily and reharden the pool water.

Whether it is necessary to provide heat in addition to the galvanic effect described above will depend somewhat on the nature of the water used in the swimming pool and the extent of the galvanic action as explained above as well as the mechanical factors involved in the removal of scale flakes. These mechanical factors not only include the turbulence of the water and the formation of hydrogen, both of which will vary with different systems, but also depends upon the expansion characteristics of the cathode which are considered to be important.

In other words, the alternate expansion and contraction of the smooth cathode surface which is obtained during the alternate heating and cooling that the cathode undergoes between operation and non-operation, and particularly where a heater is used, increases the ability of the cathode to shed calcium. This expansion may be substantially linear as in the embodiment of FIGURES 1 through 4, or it may provide a rather large change in curvature such as is encountered in the embodiment of FIGURE 5. It should also be appreciated, that some change in curvature will also occur in the embodiments of FIGURES 1 through 4 through the alternate expanding and shrinking of the circumferential cylindric surface. However, the use of the helical electrode of FIGURE 5 or other highly changing surfaces such as a bimetallic strip, will give excellent changes in curvature with respect to changes in temperature that will greatly assist in the removal of the scale.

Referring again to FIGURES 1 and 2, it is seen that the cathode 32 contains a smooth surface 34 on the outer surface of a tubular member with a heater 37 held within the tube in conventional manner. The sleeve then serves as a cathode and has an L shaped holding piece 43 with lead wire 38 wired thereto in much the same fashion that lead wire 39 is wired to the anode 33. Lead wires 38 and 39 are connected to a suitable direct current source contained in control box 22 as explained above. Heat for the heater is provided through supply line 41 which may be connected to a conventional power source 23 through suitable switching means on the board 22.

The embodiment of FIGURE 5 is similar to that of FIGURES 1 and 2 except that a different form of cathode 32a is shown. In this embodiment, the cathode 32a consists of a helical strip of metal 42 having a smooth surface 34a. This strip 42 is suitably attached by welding or soldering or other means to a holding tube or piece 43a that extends through the housing in a similar fashion to the tube 42 and has the lead wire 38 connected thereto. In the embodiment of FIGURE 5, no heater is shown, but it will be appreciated that a heater could be provided with this embodiment also, if desired. It should also be appreciated that other means of changing the curvature such as a bimetallic strip or other known elements may be substituted for the unit shown in FIGURE 5, and it is not considered necessary to illustrate all of these variations, because they are well-known to those skilled in the art.

In the preferred form shown in FIGURE 1, an accumulator 19 is placed in the supply line 12 downstream of the cell 16 to collect the scale sloughed off from the cathode in the cell. Although this accumulator is optional to the operation of the basic invention, it is considered advantageous because it assists in keeping the swimming pool water clean and in achieving the beneficial result of calcium removal which in turn provides softer swimming pool water.

As best seen in FIGURE 1 this accumulator comprises a housing 44 having a baffle 46 therein and a settling section 47 equipped with a suitable valve 48 at the bottom thereof. In this way, the baffle causes the scale to fall into the section 47 and the scale is removed by operation of valve 48. The opening of valve 48 allows a certain amount of water to pass out through the lower portion of the accumulator to flush out the scale accumulated therein.

With the unit set up as described, salt is added to provide chloride in the water as explained in the Lindstaedt patent cited above and the unit turned on. In operation, it is important to provide periods of "on" time alternately with periods of "off" time to give the galvanic action which takes place during the "off" time sufficient time to be effective and to have the "on" time sufficient to provide the desired heating. In this connection, when a heater is used, it is considered advisable to operate the heaters during the beginning portion of the operation of this cell so that the scale will be layed down hard from substantially the beginning of the operation. It will also be appreciated that the time durations will vary depending upon the particular unit and the conditions under which the unit must perform. It should also be appreciated, that as the unit is in operation, the water will become softer and the scale problem will be slowly reduced so as to assist the unit in avoiding build-up of calcium therein.

In a typical operation, daily cycles are used with the "on" time being a period of say 12 hours and the "off" time a period of say 12 hours. Other operations have utilized a period of 10 hours "on" time and 14 hours "off" time, and it is believed that a wide variation may be achieved with excellent results. It is also believed that intermittent operation of the heater may have certain advantages in that the clock timer 25 may be utilized to have the heater on during only part of the time that the electrolytic action is on. In this way, the heater may be on and off several times during a single continuous "on" time for the electrolytic portion of the cell. This promotes temperature fluctuation and helps in the mechanical action described above.

Units constructed according to the invention have been tested and show excellent operating characteristics indicating a life expectancy that will be a matter of years rather than the relatively short durations heretofore encountered. Although a small film of the cathode is lost during each "on-off" cycle, this film is extremely thin and hundreds of cycles are possible with relatively thin-walled cathodes.

From the foregoing description, it is seen that we have provided an improved electrolytic cell capable of producing chlorine from a salt or chloride containing solution without the attendant problems of scale formation heretofore encountered. In addition, it is seen that we have provided a method and apparatus for chlorinating swimming pools in which an improved electrolytic system is utilized and in which the swimming pool water is simultaneously softened.

We claim:

1. An electrolytic cell for making chlorine from chloride solutions by electrolysis, comprising a housing having openings at both ends adapted for connection in a fluid conduit, a cathode in said housing, an anode in said housing in evenly spaced relation to said cathode and means for impressing an electric potential between said cathode and said anode, said cathode being constructed of a metallic material having a smooth curved surface, said metallic material being higher than the anode material in the electromotive series, means for providing direct electrical contact between said electrodes so that the electrolytic cell will act as a galvanic cell when aqueous electrolyte is present and no external voltage is applied and the cathode metal will form a metal oxide coating, said oxide coating being capable of relatively easy removal from said cathode for removal of scale forming over the oxide coating.

2. The electrolytic cell defined in claim 1, in which the metallic material of the cathode contains a member of the class consisting of nickel and chromium.

3. The electrolytic cell defined in claim 1, in which the cathode has an external heater associated therewith for increasing the hardness of scale formed thereon and rendering the scale more easily removable.

4. An electrolytic cell for making chlorine from chloride solutions by electrolysis, comprising a housing having openings at both ends adapted for connection in a fluid conduit, a cathode in said housing, an anode in said housing in evenly spaced relation to said cathode, and means for impressing an electric potential between said cathode and said anode, said cathode being constructed of a metallic material having a smooth outer surface and formed in a helical configuration, said cathode also being anchored at one end so that it is free to change its curvature during changes in temperature differential and strip off calcium deposits from the cathode during the heating that accompanies normal electrolytic operation.

5. An electrolytic cell for making chlorine from chloride solutions by electrolysis, comprising a transparent housing having openings at both ends for connection in a fluid conduit, a cathode centrally disposed in said housing, an anode disposed in juxtaposed position to the transparent wall of said housing in evenly spaced relation to said cathode, said anode being of mesh-like construction having a platinum surface, and means for impressing an electric potential between said cathode and said anode, said cathode being constructed of a metallic material having a smooth surface, said metallic material being higher than platinum in the electromotive series whereby the electrolytic cell will act as a galvanic cell when aqueous electrolyte is present and no external voltage is applied and the cathode metal will form a metal oxide coating, said oxide coating being capable of relatively easy removal from said cathode for removal of scale forming over the oxide coating.

6. The electrolytic cell defined in claim 5, in which the metallic material of the cathode contains a member of the class consisting of nickel and chromium.

7. The electrolytic cell defined in claim 5, in which the cathode has an external heater associated therewith for increasing the hardness of scale formed thereon and rendering the scale more easily removable.

8. In combination, an article containing an aqueous chloride solution to be chlorinated, a fluid line operatively connected to said article for removing solution therefrom and recycling same to the article, pump means for moving said solution through said line, an electrolytic cell disposed in said fluid line, and an accumulator in said fluid line downstream of the electrolytic cell; said electrolytic cell comprising a housing having openings at both ends adapted for connection in a fluid conduit, a cathode in said housing, a platinum anode in said housing in evenly spaced relation to said cathode, means for impressing an electric potential between said cathode and said anode, an external heater associated with the cathode, said cathode being constructed with a smooth surface from a metallic material containing a member selected from the class consisting of nickel and chromium, said cathode being formed in a geometry that changes its curvature during temperature changes an amount sufficient to strip off calcium deposits from the cathode.

9. In combination, an article containing an aqueous chloride solution to be chlorinated, a fluid line operatively connected to said article for removing solution therefrom and recycling same to the article, pump means for moving said solution through said line, an electrolytic cell disposed in said fluid line, said electrolytic cell comprising a housing having openings at both ends adapted for connection in a fluid conduit, a cathode in said housing, an anode in said housing in evenly spaced relation to said cathode and means for impressing an electric potential between said cathode and said anode, said cathode being constructed of a metallic material having a smooth outer surface and formed in a helical configuration, said cathode also being anchored at one end so that it is free to change its curvature during changes in temperature differential and strip off calcium deposits from the cathode during the heating that accompanies normal electrolytic operation.

10. In combination, an article containing an aqueous chloride solution to be chlorinated, a fluid line operatively connected to said article for removing solution therefrom and recycling same to the article, pump means for moving said solution through said line, an electrolytic cell disposed in said fluid line, a transparent housing having openings at both ends for connection in a fluid conduit, a cathode centrally disposed in said housing, an anode disposed in juxtaposed position to the transparent wall of said housing in evenly spaced relation to said cathode, said anode being of mesh-like construction having a platinum surface, and means for impressing an electric potential between said cathode and said anode, said cathode being constructed of a metallic material higher than platinum in the electromotive series, with the cathode having a smooth curved surface that changes its curvature during temperature changes in amount sufficient to strip off calcium deposits from the cathode.

11. In combination, an article containing an aqueous chloride solution to be chlorinated, a fluid line operatively connected to said article for removing solution therefrom and recycling same to the article, pump means for moving said solution through said line, an electrolytic cell disposed in said fluid line, an accumulator in said fluid line downstream of the electrolytic cell, a transparent housing having openings at both ends for connection in a fluid conduit, a cathode centrally disposed in said housing, an anode disposed in juxtaposed position to the transparent wall of said housing in evenly spaced relation to said cathode, said anode being of mesh-like construction having a platinum surface, means for impressing an electric potential between said cathode and said anode, and an external heater associated with the cathode, said cathode being constructed with a smooth surface from a metallic material containing a member selected from the class consisting of nickel and chromium.

References Cited

UNITED STATES PATENTS

| | | | |
|---|---|---|---|
| 2,490,730 | 12/1949 | Dubilier | 204—272 X |
| 2,864,750 | 12/1958 | Hugles et al. | 204—149 |
| 2,882,210 | 4/1959 | Jenks | 204—152 |

FOREIGN PATENTS 623,382  10/1962  Belgium.

HOWARD S. WILLIAMS, *Primary Examiner.*

JOHN H. MACK, *Examiner.*

D. R. JORDAN, *Assistant Examiner.*